March 31, 1931.  G. W. SLIGHT  1,798,279
DENTURE MANUFACTURE
Filed July 7, 1927
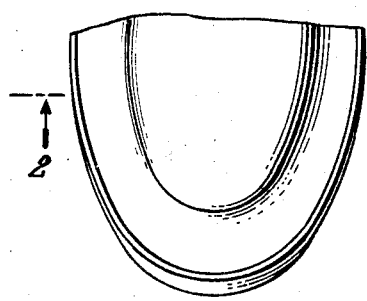
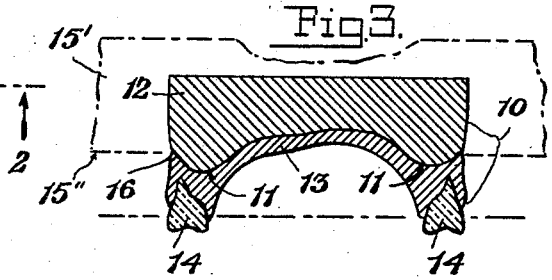
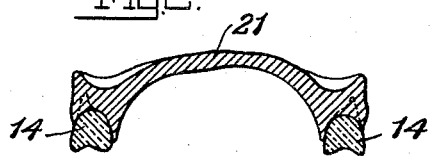
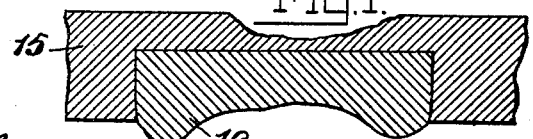
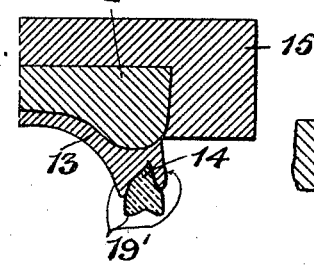
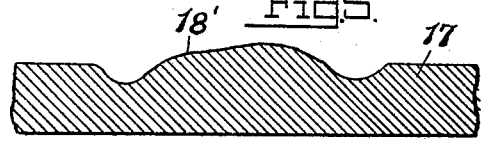
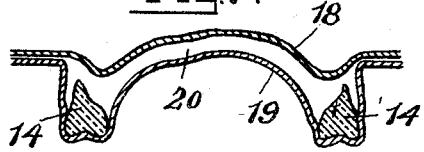
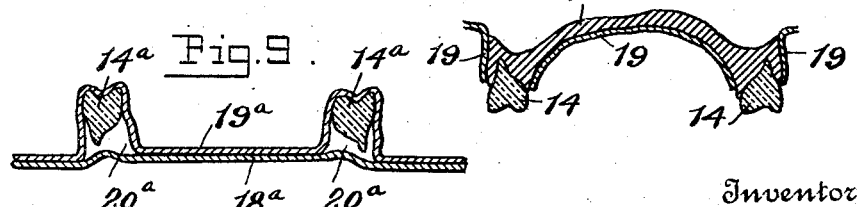
Inventor
George W. Slight
By his Attorneys
Edwards & Henry Patented Mar. 31, 1931

1,798,279

UNITED STATES PATENT OFFICE

GEORGE W. SLIGHT, OF BROOKLYN, NEW YORK

DENTURE MANUFACTURE

Application filed July 7, 1927. Serial No. 203,887.

This invention relates to dentures and denture processes; the term "denture" being used herein throughout, and particularly in the claims, as covering either a full denture or a partial denture or wherever one or more artificial teeth or a tooth portion, is to be anchored in a gum simulating material as a step in prosthetic dentistry, although the illustrative embodiment of the new article of manufacture pursuant to the invention will be herein illustrated and described as a full denture.

An object of the invention is to provide a denture wherein the gum simulating portion, hereinafter called the gum portion, may be of an improved material and/or one more conveniently or inexpensively worked than vulcanite and other materials previously employed. Vulcanite, for instance, while capable of being formed and set to finished hardness, has many disadvantages in use in the mouth, among which are excessive porosity, unsanitary character due particularly to inability to sterilize the same in hot water, bad appearance because color is usually sacrificed for strength, low thermal conductivity and continued presence of free chemicals, resulting in mouth soreness. I am unaware of any substitute for vulcanite, or vulcanized rubber, as now used, which is entirely free from all the above disadvantages or which does not have undesirable characteristics so far as manufacturing technique is concerned and also in regard to behavior in the mouth.

Another object of the invention is to provide a new and improved method or process of manufacturing a denture to include a gum portion formed of a material which is sulphur-free, and yet a method having a simpler and improved technique than methods as heretofore proposed for dentures including gum portions of materials other than vulcanite.

Another object is to provide a new and improved method or process of manufacturing a denture, regardless of the material of which the gum portion is formed, by the aid of electrolysis, so far as one or more steps of the method are concerned.

Another object is to provide a practicable method or process of manufacturing a denture including a gum portion formed of a material hardened into a predetermined set and shape during fabrication of the denture, and requiring for such hardening a greater pressure than that sustainable by casts made of plaster of Paris or a substantially similarly frangible material. Among the various materials available for such gum portion, and highly desirable for making same,—provided a practicable method for handling such a material, such as the method herein to be disclosed, is at hand,—there now occur to me, for instance the phenol-formaldehyde substance widely known as "bakelite", or any other thermo-plastic substance. In testing the new process, I have had particular success with bakelite; and, consequently, in the description of the illustrative method steps of which are delineated in the accompanying drawing, I shall refer to bakelite as the material employed, but not at all, of course, as indicating the only material which could be employed, in carrying out the invention pursuant to its main principles as set forth in the claims.

Another object is to provide a new and improved method or process of manufacturing a denture (whatever be the material employed for the gum portion) characterized by the ability, more conveniently or with less hand labor than heretofore, to reproduce faithfully in the finished denture the exact contour of the mouth parts to which the denture is to be applied as recorded in the impression originally taken by applying plaster of Paris or any other suitable material against said mouth parts.

Various other objects and advantages of the invention than those hereinabove mentioned will be specifically pointed out or will be apparent hereinafter in the course of the below detailed description of the form of the invention shown, in the accompanying drawing, as a preferred one of the various possible embodiments of the invention; it being understood, naturally, that such form is merely illustrative of one of the many possible combinations and arrangements of parts well calculated to attain the objects of the invention, and hence said detailed description of such form is not to be taken as at all defining or limiting the invention itself. That is to say, the scope of protection contemplated is of course to be taken from the appended claims, interpreted as broadly as is consistent with the prior art.

In the accompanying drawing:

Fig. 1 is a top plan view of a finished denture for the upper part of the mouth and hence including a palate-plate portion, as made to-day in the art by other methods than that of the present invention, and as produced also by the present invention except for the material employed for the gum portion;

Fig. 2 is a transverse section, taken on the line 2—2 of Fig. 1;

Fig. 3 is a sectional view (as are Figs. 4 to 9) taken on a line corresponding to said line 2—2, Fig. 3 showing in full lines what is known as the model;

Fig. 4 shows the artificial teeth and the wax in which the latter are set to assist in making the model, removed as one unit from the plaster of Paris male form or equivalent part of the model, and further shows said male form as thereafter invested in a block of plaster of Paris or other suitable material—according to present practice in the art;

Fig. 5 shows the plaster of Paris female form made from the male form of Fig. 4 and having on its upper side depressions corresponding to the elevations and elevations corresponding to the depressions on the underside of said male model;

Fig. 6 shows the right hand half of the parts of Fig. 4 after the latter have been employed for making the female form of Fig. 5, and after the parts of Fig. 4 have had reapplied thereto the artificial teeth and their wax setting, to reestablish the assemblage of parts as shown in Fig. 3;

Fig. 7 shows certain metallic parts formed by electrodeposition, with one of said parts in position-locking engagement relative to the artificial-tooth complement of the denture when finished, and with both said metallic parts arranged as they would be during the shaping and setting of the gum-portion material in the cavity or mold-chamber indicated;

Fig. 8 shows said gum-portion material as having been formed about the tooth roots in said cavity, with the upper metallic part of Fig. 7 lifted away, and with portions of the lower metallic part removed sufficiently to permit the remainder of said lower metallic part to be simply and easily stripped clear,—to provide the denture of Figs. 1 and 2; and Fig. 9 is a view corresponding to Fig. 7, but illustrating a step in the process of making a full mandible denture, or full denture for the lower part of the mouth.

Similar reference characters refer to similar parts throughout the several views of the drawing.

From what has already been said, it should be clear to those skilled in the art that the model 10 of Fig. 3 may, when desired, be obtained in a manner known in the art; that is, by applying plaster of Paris or the like to the mouth parts to be fitted with the denture to be made, then permitting this mass of plaster to set sufficiently permanently to retain the correct impression of said mouth parts (thereby to obtain a replica in female of the male parts), then removing said female replica from the mouth, then applying plaster of Paris to said female replica (thereby obtaining again a male replica or a true reproduction of the gum parts, as indicated at 11 in Fig. 3), then shaping said male replica (indicated in the drawing at 12), then applying wax and modeling the same as indicated at 13 while setting in such wax and positioning the artificial teeth 14, then investing the replica 12 in a plaster of Paris block 15 (so that, as indicated at 15′ in Fig. 3, the surface 15″ of the block will be at the outer upper peripheral edge 16), then temporarily removing the wax 13 and teeth 14 as one unit from the second male or true replica 12, then making a female reversal of said member 12 out of plaster of Paris to provide the form 17 of Fig. 5, and then reapplying the entity including the wax 13 and the teeth 14, to the replica or form 12 in block 15, to obtain the set-up of Fig. 6.

The foregoing describes one way of preparing the forms on which copper or any other suitable metal is to be electrolytically deposited, to obtain the metal sheet 18 of Fig. 7 against the surface 18′ of Fig. 5 and to obtain the metal sheet 19 of Fig. 7 against the surfaces 19′ of Fig. 6; the procurement of which sheets or equivalents, is one of the essential features of the invention. It will be understood that some other way than that above described of obtaining and building up a model 10, whether or not said model be a "wax" model as above, may be employed; and also that some other way than that above described may be employed for obtaining the form 17. But I have so far obtained good results by preparing for the electrolytic step of the invention by following familiar technique as above indicated. I have mentioned above that in order to secure the form 17 for the purpose of producing the mold sheet 18 therefrom, the wax 13 and the teeth 14 secured in said wax, may be temporarily removed as a unit from their support 12 and thereafter later restored to said support for the purpose of producing the sheet 19. In some cases this has been found objectionable due to the possibility of the teeth shifting their positions slightly in their wax support, or the wax becoming distorted, during the process of removing and later restoring the wax and contained teeth from the support 12. In cases where such objections arise, the teeth and their wax form 13 need not be removed from their support 12 until after the electrodeposit producing the sheet 19 has been formed.

Referring to Fig. 7, the sheet 18 is obtained by merely lifting the same off the form 17 of Fig. 5 when a sufficient thickness of metal has been deposited. As to the sheet 19 of Fig. 7, this, when first obtained by stripping the same off the form of Fig. 6, not only has the teeth 14 locked therein, but has also therein the wax 13. This wax is easily removed by slight heating and pouring off, or even by mere stripping; thus to leave the sheet 19 and the teeth 14 as one rigid structure as shown in Fig. 7. When the sheets 18 and 19 are then arranged as shown in Fig. 7, there is provided between them a cavity or mold-chamber 20 having, unlike previous similar mold-chambers, walls of a self-sustainingly rigid material under considerable pressures. By considerable pressures, I mean pressures appreciably in excess of pressures under which an ordinary plaster of Paris mold would chip, fracture, distort or otherwise deteriorate. The method for the provision of this mold-chamber within the sheets 18 and 19 (forming in and of itself a distinct feature of the present invention) permits the sheets 18 and 19 to be utilized according to various practices in prosthetic dentistry; and I contemplate protection hereunder for any and all such practices. Thus, even when the sheets 18 and 19 are made of a comparatively soft metal such as copper, (although I do not limit myself to that metal, I now prefer it as the result of my tests to date), the mold-chamber 20 may be employed for forming the gum portion of the denture of any thermo-plastic material or any other material of the kind above indicated requiring for its final setting and shaping high pressures in comparison with previously used materials for the gum portion; or the mold-chamber 20 may be employed for forming the gum portion of the denture of any of said previously known gum-portion materials, or indeed of any material. Where the mold-chamber 20 is used in connection with the previously known gum-portion materials, the backing for the sheets 18 and 19 may conveniently be plaster of Paris, but where some other kinds of material are used, it may be found desirable to make the backings for the sheets 18 and 19 of zinc or some similar material of less frangibility than plaster of Paris.

The phenol-formaldehyde substance widely known as "bakelite" has long been recognized as an ideal material for the gum portion of a denture; which is why I have preferred it for my experiments. It has also been recognized that this material could not be used in prosthetic dentistry until some method of obtaining molds constructed or constituted to withstand the necessary heat and pressure required to set and shape bakelite, was available. By the present invention, by which may be obtained the sheets 18 and 19, the latter holding the teeth 14, such a mold is made possible, for the first time so far as I am aware. Not only is such a mold made possible by the present invention, but also a mold which will faithfully reproduce all the form, fit and definition of the original model as finished to represent the work desired for the mold, and this gives the additional advantage of eliminating the cruder method of engraving and hand-finishing previously employed.

As is known, bakelite is set and shaped by heat and pressure. The sheets 18 and 19, preferably backed as above described, form a means whereby the high pressure required, as well as the heat, may be easily and safely applied. Since I prefer to use electric heat, the new mold may have its two halves, if the sheets 18 and 19 are backed by zinc or other metal as above, consist merely of the two sheets and their backings. I have used such a mold, and have obtained the heat by applying electrically heated platens or frames containing electric-resistance grids or wires, against the mold parts. Excellent dentures have been obtained of bakelite in this manner, when proceeding as follows: The pressure applied is about 2200 pounds per square inch on a ram 3½" in diameter, which pressure is applied when the mold has been brought to a temperature of about 260° F. The pressure is maintained while the temperature is raised, over a period of two or three minutes, to between 310 and 330° F. After several minutes, the denture is ready for removal from the mold.

When this operation has been completed, the cavity 20 will be filled with a properly finished and shaped denture including the teeth 14 and the bakelite gum and palate portion as indicated at 21 in Figs. 2 and 8. The sheet 18 and its backing are lifted off, to free the upper surface of the denture as shown in Fig. 8.

The next step is to remove the sheet 19 and its backing.

An important feature of the invention is the electrolytic removal of a part of this sheet 19, to release the same from interlocking relation with the parts of the teeth 14 shown free of the sheet 19 in Fig. 8. Before this is done, the backing should be removed; and to prepare for the easy removal of the backing just before this electrolytic-removal step, the backing is not cast directly against the sheet 19, but is cast against an interposed layer of plastic material known to the trade as "artificial stone".

It will be seen from Fig. 8 that the sheet 19, on removal of the parts of Fig. 8 from the electrolytic bath at a time when the sheet 19 has been eaten away as shown, may be lifted or stripped from the other parts shown in Fig. 8, to leave the finished denture of Fig. 2.

Referring finally to Fig. 9, this shows how readily the invention, even according to the above illustrative method, may be applied to the making of dentures for the lower part of the mouth. Teeth 14a will be noted, locked in place in a copper sheet 19a, against which sheet 19a is applied a copper sheet 18a. The sheets 18a and 19a correspond, as to functional relation, with the sheets 18 and 19 of Fig. 7; and the cavity or mold-chamber 20a similarly corresponds with the mold-chamber 20 of Fig. 7.

I claim:

1. The method of making a denture which involves obtaining a mold-cavity wall by electrodepositing a metal sheet against a reverse-replica of said cavity having a tooth temporarily positioned therein so that the non-root portions of said tooth will be protruded from the replica thereby to have the metal sheet electrodeposited function to lock said tooth in predetermined position against the sheet when the latter is stripped from said replica, then utilizing said sheet as a mold-cavity wall while shaping and setting in said cavity a gum portion for the denture, and then electrolytically removing parts of said sheet at the tooth to free the finished denture for separation from said sheet.

2. The method of making a denture which involves producing a mold of a metallic sheet by an electrodeposit on the face of a replica of a mouth impression, in forming another sheet by an electrodeposit over a set of teeth and temporary mount therefor, in disposing of the temporary mount for the teeth leaving said teeth held in the electro-deposited sheet formed over them, in placing the several metallic sheets in operative relationship, in molding a gum portion between said sheets and about the prong portions of the teeth held thereby and in thereafter electrolytically freeing the sheets from engagement with the moulded gum portion and teeth.

3. The method of making a denture consisting in forming an electrodeposit over a set of teeth and a temporary mount, in removing the mount and solely supporting the teeth by said electrodeposit during the formation of a gum portion for said teeth and in electrolytically freeing said electrodeposit after the formation of the gum portion.

4. The method of making a denture which involves obtaining a mold wall by electrodepositing a metal sheet over a meltable mount and a tooth temporarily positioned therein so that the root portions of said tooth will be exposed within the sheet when the mount is removed and in thereafter electrolytically disposing of the metal sheet to free the tooth therefrom.

5. The method of forming a denture consisting in molding a gum portion between a pair of electrolytically formed metallic sheets, one of said sheets extending over and maintaining a set of teeth in their proper positions during the molding of said gum portion and in electrolytically freeing the sheets after the molding of said gum portion.

6. The method of forming a mold wall for producing one face of a gum portion, consisting in electrodepositing a metallic sheet over the surface of a mouth impression or replica, in removing said sheet from the support over which it was deposited, and utilizing it as a mold-wall section and in thereafter electrolytically freeing said sheet.

7. The method of making a denture consisting in depositing a metal sheet over a set of teeth and a temporary mount, in removing the mount and solely supporting the teeth by the metal sheet during the formation of a gum portion for said teeth and in electrolytically removing the metal sheet from its engagement with the teeth after the formation of the gum portion.

In witness whereof, I have hereunto signed my name this 5th day of July, 1927.

GEORGE W. SLIGHT.